United States Patent Office 3,426,881
Patented Feb. 11, 1969

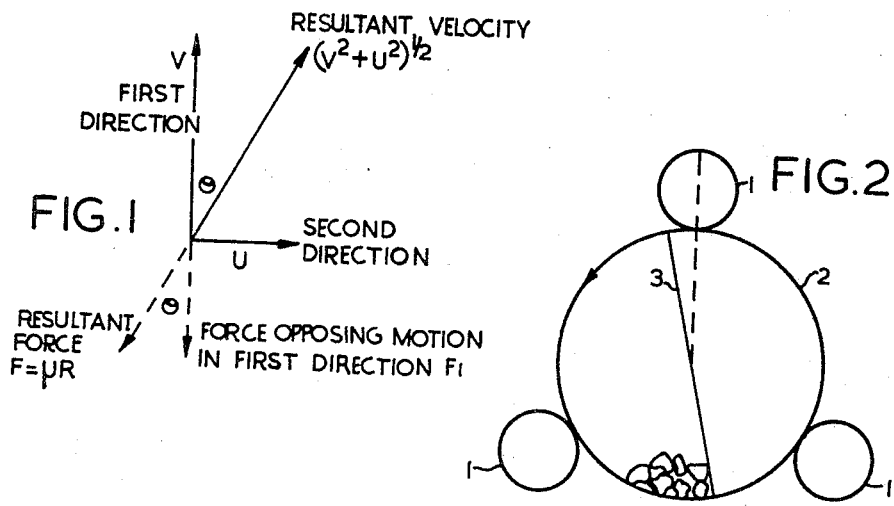
FIG.1
FIG.2
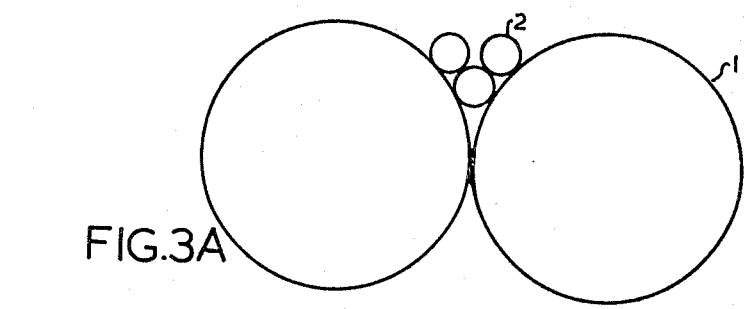
FIG.3A
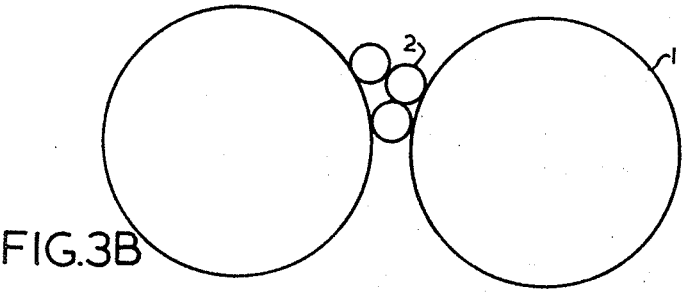
FIG.3B
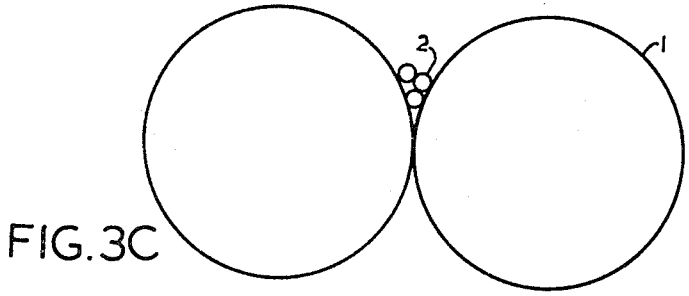
FIG.3C
INVENTOR
FRANCIS B. DWYER

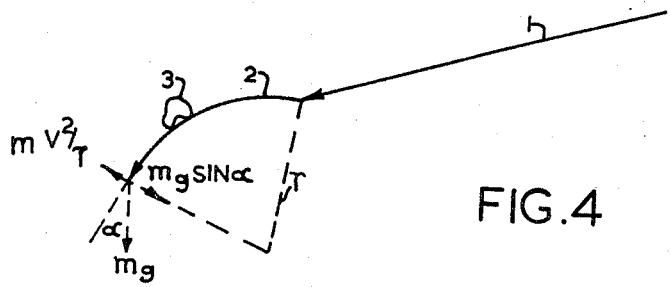
FIG. 4
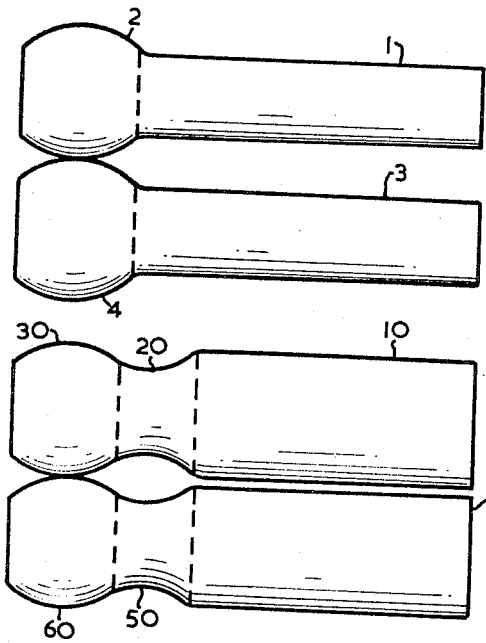
FIG. 5A
FIG. 5B
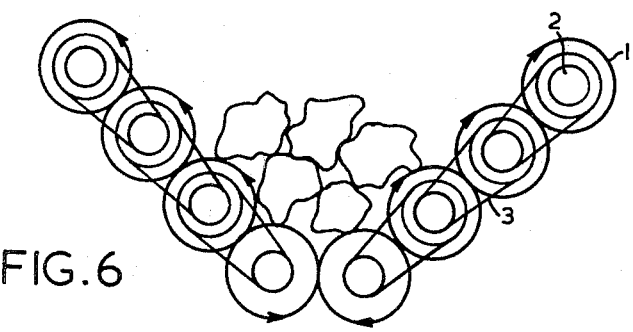
FIG. 6

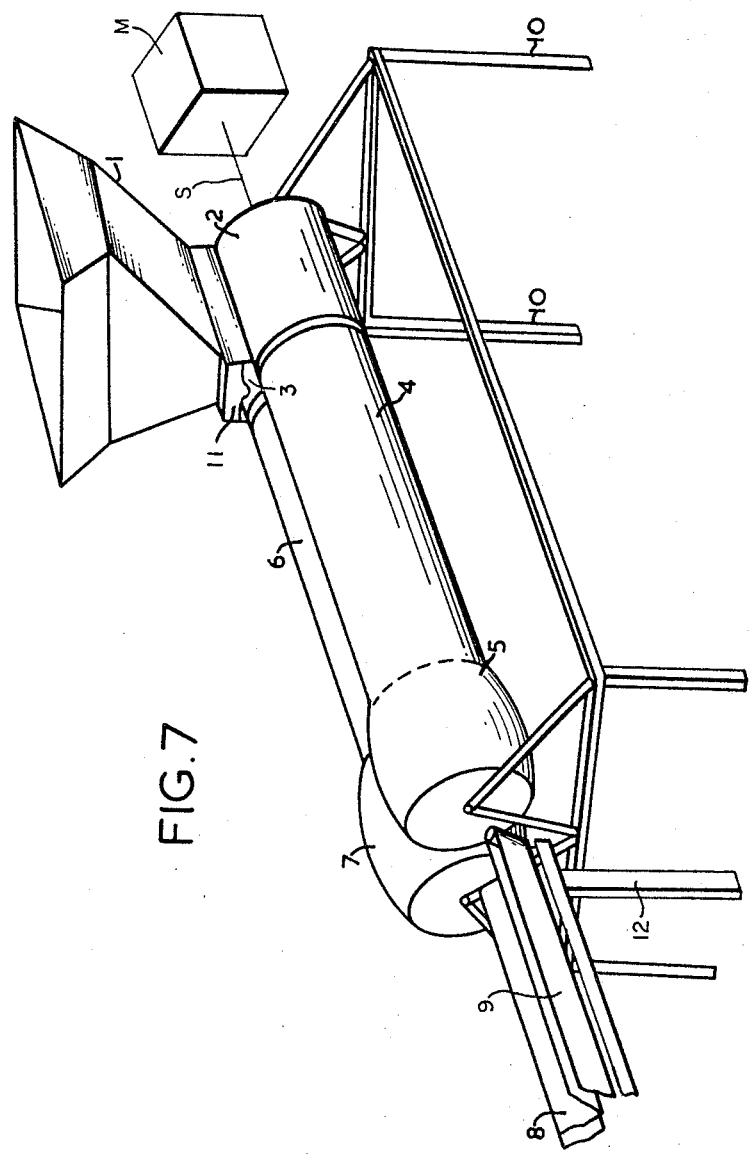

3,426,881
METHOD AND APPARATUS FOR ALIGNING BODIES
Francis B. Dwyer, Marrickville, New South Wales, Australia, assignor to The Colonial Sugar Refining Company Limited, Sydney, New South Wales, Australia, a company of New South Wales
Filed Aug. 24, 1966, Ser. No. 574,708
Claims priority, application Australia, Sept. 2, 1965, 63,571/65; Dec. 9, 1965, 67,689/65; Feb. 4, 1966, 1,274/66
U.S. Cl. 198—30
Int. Cl. B65g 47/26
1 Claim

ABSTRACT OF THE DISCLOSURE

Method and apparatus for obtaining a single row alignment of bodies by separating them longitudinally and simultaneously guiding them transversely into a single row, in which the bodies are caused to slide longitudinally down an inclined potential energy trough formed by one or more moving surfaces selected in such a way that the sliding bodies are submitted transversely to progressively varying degrees of longitudinal frictional retardation.

---

This invention relates to a method of and apparatus for obtaining a single row alignment of bodies. It has been developed for application to the aligning of pieces of ore prior to sorting, but can also be applied to the aligning of a wide variety of body types, by way of illustration—cartons, cans, fruit, biscuits, matches, logs, nails, screws, electrical components, luggage.

According to United States Patent No. 2,594,337 by H. C. Noe (issued Apr. 29, 1952), and United States Patent No. 3,133,624 by B. M. Craig (issued May 19, 1964), it is known to effect the aligning of bodies by feeding them to the apex of a conical surface rotating about a vertical axis. The bodies slide under centrifugal and gravitational forces into pressure contact with a spirally curved vertical guide surface and are led thereby into paths of progressively increasing radius. Their speed and separation are effectively increased and they are ejected from the device in a single row alignment.

For certain applications, the following disadvantages among others have been noted in the operation of this known type of apparatus:

(1) The bodies are necessarily ejected with an appreciable separation between them, thus militating somewhat against attempts to increase throughput as by increasing the speed of rotation of the cone;

(2) Quite apart from the separation factor, throughput is found to be little affected by increasing the speed of rotation of the cone beyond a certain value;

(3) Bodies aligned by means of the apparatus are usually found to be rotating as they are ejected from it.

According to United States Patent No. 2,776,037 by G. M. Baigent (issued Jan. 1, 1957) there is provided a feeder and conveying mechanism for bodies comprising a hopper, a rotatably mounted straight downwardly inclined feeding tube having its upper end scoop shaped to agitate the bodies in said hopper, said upper end being mounted in the lower end of said hopper and communicating with the interior thereof, two conveying rollers rotatably mounted side by side and spaced from one another thereby forming a channel for said bodies, said rollers being mounted immediately below said feeding tube with said feeding tube located above said channel between said rollers, said rollers having their input end adjacent the lower end of said feeding tube to receive said bodies fed therethrough, means for rotating said feeding tube, means for rotating said conveying rollers, said hopper and feeding tube being pivotally mounted at one end and means provided at the other end for varying the inclination thereof. Due to the rotation of the rollers, the bodies which are supplied to the input end of the rollers are caused to be in a continual state of agitation as they move along the length thereof and, as a result of this agitation, they settle down into a stream of bodies moving in line along the length of the rollers to the delivery ends thereof from which they are discharged one by one.

In certain cases, the following disadvantages among others have been noted in the operation of this known apparatus:

(1) Unless very long rollers are employed, it is found that bodies having a single major dimension (for example, matches, cylinders) do not settle down into an aligned row even though the rotation of the rollers ensures that they are in continual agitation;

(2) It is found that bodies of low density (for example blocks of wood, corks, peas, coffee beans, cannot easily be aligned since they tend to bounce on rotating roller surfaces.

It is an object of the present invention to provide a simple method whereby it is possible to obtain a single row alignment of bodies of various types and shapes.

It is another object of the invention to provide a simple method whereby it is possible to obtain a single row alignment of bodies in closely abutting relationship.

It is a more particular object of the invention to provide a simple method whereby it is possible to obtain a single row alignment of non-rotating bodies at a controllable and demand-sensitive rate of throughput.

Other objects of the invention will be apparent from the description hereinafter.

The invention is based on the differential frictional retardation of bodies sliding under a force in frictionally differential pressure contact with one or more selected moving surfaces.

In the drawings, FIGURE 1 shows the frictional force opposing the motion of a body sliding in a first direction with a velocity, V, against a surface moving in a second direction with a velocity, U.

FIGURE 2 shows a cross-section of apparatus for aligning according to an embodiment of a first aspect of the invention.

FIGURE 3 shows cross sections (B) and (C) of apparatus for aligning according to a second aspect of the invention. The figure also shows a cross section (A) of apparatus for aligning by a known method which does not conform to the second aspect of the invention.

FIGURE 4 shows the path described by a body sliding in apparatus for aligning according to an embodiment of second aspect of the invention.

FIGURE 5 shows plan views (A) and (B) of apparatus for aligning according to an embodiment of the second aspect of the invention.

FIGURE 6 shows a cross section of apparatus for aligning according to a third aspect of the invention.

FIGURE 7 is a perspective drawing showing apparatus for aligning according to an embodiment of a second aspect of the invention and including means for feeding and retrieval of bodies.

The principles underlying the method and apparatus of the invention will be appreciated from a consideration of the following:

(A) A body sliding against a surface suffers a frictional retardation in a direction parallel to and opposed to the direction of sliding;

(B) The magnitude of frictional retardation, F, suffered by a body sliding against a surface is given by $\mu R$, the product of the dynamic coefficient of friction and the normal reaction between the body and the surface.

It is a consequence of (A) that the direction of frictional retardation suffered by a body sliding in a first direction with a velocity, V, against a surface moving in a second direction with a velocity, U, is parallel to and opposed to the direction of the vectorial summation of V and U; and it is a consequence of (A) and (B) that the component of frictional retardation, $F_1$, opposing motion in the first direction is dependent both on (i) $\mu R$ and on (ii) the angle, $\theta$, between the first direction and the direction of the vectorial summation of V and U.

Referring to FIGURE 1 of the annexed drawings, it can be readily seen that the component of frictional retardation opposing motion in the first direction is given by $\mu R \cos \theta$ or $\mu RV/(V^2+U^2)^{1/2}$.

From the above, it follows that low coefficient of friction, low normal reaction, and high velocity of a surface moving in a second direction, are all conducive to a low component of frictional retardation opposing the motion of a body sliding on that surface in a first direction; conversely, high coefficient of friction, high normal reaction, and low velocity of a surface moving in a second direction, are all conducive to a high component of frictional retardation opposing the motion of a body sliding on that surface in a first direction.

Applying these concepts, it is clear that the members of a batch of bodies can be separated from each other by causing them to slide longitudinally on one or more moving surfaces selected such that the bodies comprising the batch are submitted to a gradient of frictional retardation by virtue of a progressive variation of $$\mu RV/(V^2+U^2)^{1/2}$$

transversely across the surface or surfaces. The method of obtaining a single row alignment of bodies according to the present invention depends on establishing such a gradient while bodies are sliding gravitationally in an inclined potential energy trough comprising such a surface or combination of surfaces.

The term "potential energy trough" as used herein means a trough consisting of a surface or surface combination which (i) comprises transversely a central region at which a supported body has minimum potential energy, and which, when horizontally disposed, (ii) comprises longitudinally a central region along which a supported body has substantially constant potential energy.

For convenience, the invention is defined and discussed herein with respect to four aspects, particular embodiments of these aspects being numbered correspondingly. Thus, the first, second, third and fourth aspects of the invention have particular embodiments identified respectively herein by the numerals I, II, III, IV.

According to a first aspect of the invention, a method is provided for obtaining a single row alignment of bodies comprising the steps:

(1) Feeding a batch of unaligned bodies at a first site into an inclined potential energy trough comprising the trough-defining surface formed by a concentrically rotating concave member, whereby: said bodies engage in frictionally differential pressure contact with said trough-defining surface, slide differentially down said trough, and are formed progressively into a single row alignment;

(2) Retrieving from said trough at a second site said single row alignment of bodies.

It will be understood that the term "rotating" as used throughout this specification and the appended claims comprehends both continuous and intermittent movement.

According to embodiment I(a), aligning of a batch of bodies is effected in an inclined potential energy trough consisting of the single trough-defining surface formed by the interior surface of a rotating hollow cylinder. In this case, the shape of the trough-defining surface is such that the normal reaction between it and a directly supported body progressively increases with increasing height of the body above the bottom of the trough. For this reason, those member bodies of the batch which are near the bottom of the trough slide more rapidly down the trough than member bodies which are distant from it. The cylinder can be caused to rotate in a clockwise or anticlockwise direction; it can also be caused to rotate in such a manner that any radius thereof oscillates about a central position. Whatever the mode of rotation of the cylinder, bodies retrieved therefrom in a single row alignment are themselves always found to be rotating.

According to embodiment I(b), aligning of a batch of bodies is effected in an inclined potential energy trough consisting of two separate trough-defining surfaces, one such surface being formed by the interior surface of a rotating hollow cylinder and the other such surface being formed by a selected face of a fixed guide sheet. Conveniently, the width of the guide sheet is substantially equal to the internal diameter of the cylinder (the guide sheet therefore lying substantially in a plane containing the axis of rotation of the cylinder) and the length of the guide sheet is substantially equal to the length of the cylinder.

As in embodiment I(a), the cylinder can be caused to rotate in a clockwise or anticlockwise direction. Again as in embodiment I(a)—but only if it is not required to retrieve the bodies in a non-rotating condition—the cylinder can be caused to rotate in such a manner that any radius thereof oscillates about a central position.

It has been found possible however, according to embodiment I(b), to discharge the bodies from the trough in a non-rotating condition. For this to happen, it is essential for the resultant torque acting on each body to be effectively reduced to zero at the discharge site, and it has been found that this can be achieved by inclining the guide sheet transversely to the vertical at such an angle—having regard to the selected trough-defining face of the guide sheet and the selected direction of rotation of the cylinder—that, when any body slides down the trough in contact simultaneously with both trough-defining surfaces, the two frictional forces acting thereon in the direction of travel are equal.

This latter method of aligning is illustrated with reference to FIGURE 2 of the annexed drawings. This figure shows a cross-section of an apparatus comprising: an inclined hollow cylinder 2 rotating in the direction of the arrow as shown, stabilised by external guide rollers 1, and containing a guide sheet 3 inclined to the vertical. Bodies for alignment are held captive in the potential energy trough formed by the interior surface of the rotating cylinder and the shown selected face of the guide sheet, and are progressively aligned in the manner explained. By appropriately inclining the guide sheet transversely to the vertical, the resultant torque acting on each body can be effectively reduced to zero at the discharge site and the bodies can therefore be retrieved in a non-rotating condition. Clearly, if the direction of rotation of the cylinder is reversed and/or if the alternative face of the guide sheet is employed as a trough-defining surface, the angle of inclination of the guide sheet transversely to the vertical must be appropriately adjusted.

According to a second aspect of the invention, a method is provided for obtaining a single row alignment of bodies comprising the steps:

(1) Feeding a batch of unaligned bodies at a first site into an inclined potential energy trough comprising the trough-defining surfaces formed by a pair of closely spaced rotating rollers, whereby: said bodies engage in frictionally differential pressure contact with said trough-defining surfaces, slide differentially down said trough, and are formed progressively into a single row alignment;

(2) Retrieving from said trough at a second site said single row alignment of bodies;

said method being characterized by the preliminary step of selecting interdependently (a) the diameters of the rollers and (b) the separation between the rollers in such a way that, when only three said bodies are sliding down said trough in stacked relationship at any site, they are always submitted to three different degrees of frictional retardation and are consequentially formed into a single row in a minimum aligning distance.

Throughout this specification and the appended claims, the term "diameter"—as applied to rollers, means in diameter normal to the axis of rotation.

According to embodiment II, aligning of a batch of bodies is effected in an inclined potential energy trough consisting of the trough-defining surfaces formed by a pair of identical, symmetrically rotating rollers, said rollers being inclined equally in a single plane to the horizontal and being selected from the group consisting of cylinders and uniformly tapering frusto-conical sections.

"Symmetrically rotating" rollers are herein defined as a pair of rollers which are contra-rotating at any given site with the same peripheral speed and which are relatively disposed such as to satisfy either one of two conditions—hereinafter referred to as (X) and (Y)—the former condition being characterized in that at any point of instantaneous pressure contact between a trough-defining surface and a sliding body there is a component of frictional force directed away from the nip of the rollers, and the latter condition being characterized in that at any point of instantaneous pressure contact between a trough-defining surface and a sliding body there is a component of frictional force directed towards the nip of the rollers.

A pair of rollers which are "equally inclined in a single plane to the horizontal" are herein defined to be longitudinally parallel and inclined to the horizontal in such a way that the shortest line joining their central axes is horizontal.

Each of the trough-defining surfaces according to the second aspect of the invention is adapted inherently by virtue of its shape to make frictionally differential pressure contact at any site with those member bodies of the batch which it directly supports. This is a consequence of the fact that the normal reaction between a body and directly supporting roller surface progressively decreases with increasing height of the body above the nip. For this reason, those member bodies of the batch which are near to the nip slide more slowly down the trough than those member bodies of the batch which are distant from it. Since differential sliding occurs, the bodies fall progressively into single row alignment and can easily be retrieved in this condition from a second site in the trough.

Unless expressly indicated to the contrary, the second aspect of the invention is hereinafter described with reference to the method of embodiment II for the particular case when the rollers are cylinders.

It has been found that the complete alignment of a given batch of unaligned bodies can only be effected by the method of the invention when the distance between the feeding and retrieval sites at least equals a certain value which is substantially constant for the given batch of bodies sliding under a given set of conditions. The distance required to effect the complete alignment of a given batch of bodies is referred to herein as the "aligning distance."

In the case of embodiment II, for rollers inclined at 13° to the horizontal and rotating symmetrically in condition (X), the distance required to effect the complete alignment in closely abutting relationship of a batch comprising $n$ substantially equidimensional bodies, has been found to equal the average length of the aligned bodies multiplied by a factor in the range of about 1.5 to about 2.

Table 1 given results of an experiment which illustrates this finding for the aligning of a batch of small stones. The rollers consisted of a pair of identical copper cylinders in surface contact, each of diameter 5.08 centimetres and length 30.48 centimetres and inclined at 13° to the horizontal. The dynamic coefficient of friction between stone and roller surfaces was 0.2. The stones were stacked at the higher end of the trough formed by the initially stationary rollers, and the rollers were then rotated symmetrically in condition (X). Differential sliding ensued and a single row alignment of stones in closely abutting relationship was retrieved from the trough at its lower end.

The number of stones constituting the initial stack, $n$, was varied between 4 and 30 (the latter being a limiting figure having regard to the dimensions of the stones and rollers in question) and the peripheral speed of the rollers was varied between 2.54 and 19.05 centimetres per second. In each case, measurements were made of the aligning distance, $L_1$, and the length of the resulting row, $L_2$. Since the stones were in closely abutting relationship, the length of this resulting row was substantially equal to the average combined length of the stones.

TABLE 1

| $U^1$ | $d^2$ | $n$ | $L_1$ (cm.) | $L_2$ (cm.) | $L_1/L_2$ |
|---|---|---|---|---|---|
| 2.54 | 0.864 | 4 | 4.8 | 3.3 | 1.5 |
|  |  | 6 | 10.4 | 5.1 | 2.0 |
|  |  | 8 | 9.7 | 6.4 | 1.5 |
| 6.35 | 0.864 | 6 | 6.6 | 4.6 | 1.5 |
|  |  | 12 | 17.3 | 10.2 | 1.7 |
|  |  | 24 | 34.3 | 17.8 | 1.9 |
| 19.05 | 0.864 | 4 | 5.8 | 3.8 | 1.5 |
|  |  | 10 | 19.1 | 10.2 | 1.9 |
|  |  | 24 | 31.8 | 19.1 | 1.7 |
| 6.35 | 0.483 | 10 | 7.6 | 5.1 | 1.5 |
|  |  | 18 | 13.5 | 8.9 | 1.5 |
|  |  | 30 | 24.9 | 15.2 | 1.6 |

[1] $U$ is the peripheral speed of the rollers in centimetres per second.
[2] $d$ is the average diameter of the stones in centimetres.

As can be seen from Table 1, the variation in the ratio of $L_1$ to $L_2$ is within the range of about 1.5 to about 2. For given rollers at a given inclination to the horizontal, it is seen therefore that the distance required for achieving the single row alignment in closely abutting relationship of a given batch of bodies bears a substantially constant ratio to the length of the resulting row, and hence to the number of bodies constituting the batch.

The aligning distance is not appreciably affected by varying the peripheral speed of the rollers but—as will now be shown—can be varied within wide limits by varying the diameter of the rollers and/or by varying the separation between them.

An important effect which has been observed in experiments leading to the second aspect of the present invention, is that the aligning distance can be reduced by increasing the diameters of the rollers relative to the dimensions of the bodies measured in a plane normal to the direction of sliding. Thus, for a given body type, large diameter rollers favor more rapid alignment than small diameter rollers.

More particularly, it has now been found that the aligning distance is critically dependent on the body-packing characteristics of a stack of bodies when sliding down the trough formed by the two rollers. Essentially, it has been found that the diameters of the rollers and the separation therebetween should be selected with regard to the dimensions of the bodies in such a way that, when only three of the bodies are sliding down the trough in stacked relationship at any site, they are always submitted to three different degrees of frictional retardation. When this criterion is met, it is found that bodies can be formed into a single row in a minimum aligning distance.

In the case of identical cylindrical bodies sliding down the trough formed by two identical cylindrical rollers, where $\delta$ is the angle between the shortest line joining the axes of the rollers and the shortest line joining the axis of one of the rollers to the line of contact between that roller and a body nearest the nip, this criterion is equivalent to ensuring that $\delta$ does not exceed 26°. Alternatively expressed, when the rollers are minimally separated, the criterion is equivalent to ensuring that the ratio of roller diameter to cylinder diameter exceeds 8.4 to 1.

Some unfavourable and favourable body-packing situations are illustrated in FIGURE 3 of the annexed drawings. This figure shows respective cross-sections (a), (b), (c) of three identical cylindrical bodies sliding in stacked relationship down the trough formed by two identical cylindrical rollers.

In situation (a), the dimensional relationship between the bodies and the rollers is such that the defined criterion is not met, the two upper bodies being submitted to substantially equal degrees of frictional retardation by virtue of their equivalent positions above the nip. This type of body-packing leads to a relatively great aligning distance.

In situation (b), the dimensional relationship between the bodies and the rollers is such that the defined criterion is met, the three bodies being submitted to three different degrees of frictional retardation by virtue of their different positions above the nip. This type of body-packing situation leads to a relatively small aligning distance. It will be seen that an unfavourable body-packing situation in (a) has been transformed into a favourable body-packing situation in (b) by the simple expedient of increasing the separation appropriately between the rollers.

In situation (c), the dimensional relationship between the bodies and the rollers is such that the defined criterion is again met. It will be seen that minimally separated rollers which are unsuitable for aligning bodies of relatively large cross-sectional dimension—as in (a)—are nonetheless quite suitable for aligning bodies of relatively small cross-sectional dimenion.

Table 2 gives results of an experiment which illustrates these findings for the aligning of respective batches of identical, cylindrical brass bodies of various diameters ($d_1$). The rollers consisted of a pair of identical, stainless steel cylinders in surface contact, each of diameter ($d_2$) equal to 5.08 centimetres and of length 30.48 centimetres, and inclined in the same plane at 18° to the horizontal. The dynamic coefficient of friction between body and roller surfaces was 0.22. The bodies were stacked at the higher end of the trough formed by the initially stationary rollers, and the rollers were then rotated symmetrically in condition (X) with a peripheral speed of 21.08 centimetres per second. Differential sliding ensued and a single row alignment of bodies was retrieved from the trough at its lower end.

Four body types A, B, C, D were investigated, their corresponding dimensions being in the proportions respectively 3: 4: 6: 8. In the case of the largest body type, D, the length of the cylinder was 2.54 centimetres and the diameter was 1.27 centimetres. The number of bodies constituting respective batches, $n$, was varied between 3 and 8. In each case, measurements were made of the aligning distanice, $L_1$.

TABLE 2.

| Body type | $d_2/d_1$ [1] | $n$ | $L_1$ (cm.) |
|---|---|---|---|
| A | 9.5 | 3 | 3.8 |
|   |     | 4 | 5.1 |
|   |     | 6 | 7.6 |
| B | 8   | 3 | 22.9 |
|   |     | 4 | 22.9 |
|   |     | 6 | (2) |
| C | 4.8 | 3 | 22.9 |
|   |     | 4 | 26.7 |
|   |     | 6 | (2) |
| D | 4   | 3 | 25.4 |
|   |     | 4 | 30.5 |
|   |     | 6 | (2) |

[1] $d_2/d_1$ is the ratio of roller diameter to body diameter.
[2] In these cases the aligning distance was in excess of the usable length of the trough.

It can be seen from Table 2 that the aligning distances for body type A (where $d_2/d_1$ is greater than 8.4) are considerably less than those for body types B, C, D (where $d_2/d_1$ is less than 8.4). This kind of improved result is found to obtain even in the case of bodies of low density (such as corks), which tend to bounce on the rollers.

It has been deduced theoretically that—given adequate length of roller—bodies submitted to aligning by the method of the invention achieve a constant terminal velocity during sliding. This terminal velocity is found to be independent of the velocity with which they are fed into the trough formed by the rollers. If the initial feeding velocity is greater or smaller than this terminal velocity, frictional forces between body and roller surfaces cause a retardation or acceleration whereby the terminal velocity is rapidly attained. This feature is advantageous when directionally uncontrolled methods of feeding are employed—e.g. feeding from a conveyor belt or manual feeding.

The terminal velocity achieved by a cylindrical body sliding gravitationally according to embodiment II has been found theoretically to be given by the following expression:

$$\frac{V}{U} = \frac{-\mu^2 \cos \delta \tan \phi \pm \sin \delta \tan \phi [\mu^2(1+\cos^2 \delta \tan^2 \delta) - \sin^2 \delta \tan^2 \phi]^{1/2}}{\sin^2 \delta \tan^2 \phi - \mu^2}$$

where

V is the terminal velocity of the cylindrical body;
U is the peripheral speed of the rollers;
$\delta$ is the angle between the shortest line joining the axes of the rollers and the shortest line joining the axis of one of the rollers to the line of contact between that roller and the cylindrical body;
$\phi$ is the angle of inclination of the roller axes to the horizontal;
$\mu$ is the coefficient of dynamic friction between the cylindrical body and the rollers.

As will be seen hereinafter (see the results given in Table 4), this theoretical relationship has also been found to apply in practice to a first approximation.

Generally, the quotient has two different values which correspond to the two possible conditions of a pair of rollers in symmetrical rotation, viz, the greater value relates to condition (X) and the lesser value relates to condition (Y).

In either case, it is to be noted that the velocity achieved by the body sliding in the trough is dependent only on the magnitude of the variables U, $\delta$, $\phi$ and $\mu$; for example, it is independent of mass.

In the limiting case when $\delta$ approaches 0 (i.e. the body is sliding on a trough-defining surface close to the nip), the quotient $V/U$ approaches the value of $\tan \phi$ and the terminal velocity is then dependent only on the magnitude of the variables U and $\phi$.

It follows from this that the method of embodiment II can be applied to the aligning of a batch of mixed bodies having possibly unequal density and different coefficients of friction relative to the roller surfaces. This situation is well exemplified by a batch of pieces of asbestos ore comprising variable amounts of quartzite and magnetite. The coefficient of friction between a piece of quartzite or magnetite and mild steel (a possible roller material) is about 0.2, while that between a piece of crocidolite asbestos and mild steel is about 0.4; nonetheless, the method of aligning according to embodiment II can be applied readily to a batch of mixed asbestos-rich and asbestos-barren rocks.

It can be deduced from the above expression—and is found in practice—that under conditions of increasing inclination, the terminal velocity attained by aligned bodies is likewise increased.

For a given kind of body and a given kind of roller surface, there is a critical angle of inclination of the rollers to the horizontal, which—if exceeded—will occasion sliding even in the absence of roller rotation. The critical angle is primarily determined by the coefficient of friction between body and roller surfaces, but is also affected by the relative diameters of bodies and rollers. The critical angle is reduced by relatively reducing the diameter of the rollers (e.g., it approaches a minimum value of about 10° in the case of pieces of crocidolite asbestos ore and mild steel rollers as the ratio of roller diameter to average body dimension is reduced towards zero) and, correspondingly, is increased by relatively increasing the diameter of the rollers (it approaches a maximum value of about 90°, independent of the coefficient of friction, as the ratio of average body dimension to roller diameter is reduced towards zero). In the case of pieces of crocidolite asbestos ore of average dimension 7.62 centimetres and mild steel rollers of diameter 60.96 centimetres spaced apart by 1.91 centimetres, this critical angle is about 40°. As roller inclinations exceed the critical angle there is an increasing probability—particularly for high peripheral speeds—that bodies in the trough will be in unstable equilibrium; and under these conditions rolling and/or bouncing is liable to occur. For controlled operation, it is preferred to avoid such rolling and/or bouncing, and angular inclinations in the application of the invention to aligning pieces of crocidolite asbestos ore (average dimesion 7.62 centimetres) on symmetrically rotating mild steel rollers (diameter 60.96 centimetres and spaced apart by 1.91 centimetres) are preferably selected at values less than about 40°.

As can be seen from the above expression, there is a theoretically linear relationship between the terminal velocity of bodies and the peripheral speed of the rollers in symmetrical rotation. It is thus a particular virtue of the invention that—for inclinations less than critical—sliding velocity can be controlled in a simple manner by varying the peripheral speed of the rollers. For relatively low inclinations this means that the process of alignment can be effectively retarded or stopped as and when desired by simply reducing the peripheral speed towards zero. Contrariwise, throughput can be raised considerably by increasing peripheral speed. Should it be desired to decrease throughput for short periods without decreasing the peripheral speed of the rollers, it is a further virtue of the invention that sliding of an aligned row can be obstructed momentarily (e.g. by physical intervention) without causing unmanageable congestion. As the length of the rollers is increased, the more the method is capable of coping with such minor imposed obstructions.

The effect in practice of varying the peripheral speed of the rollers for a constant inclination to the horizontal is illustrated in Table 3. This table gives experimental data for the case of successive pieces of basalt of selected size range fed at the higher end into the trough formed by a pair of rollers. These consisted of identical mild steel cylinders with a constant minimum separation of 1.91 centimetres, each of diameter 60.96 centimetres and length 243.8 centimetres, rotating symmetrically in condition (X) and inclined at 16° to the horizontal. The dynamic coefficient of friction between basalt and mild steel is 0.19. Successive adjustments were made to the peripheral speed of the rollers, and in each case, the sliding velocity of the basalt pieces was measured over a 15.24 centimetres distance before the point of discharge. Terminal velocity was not attained in all cases.

TABLE 3

| Size range [1] of basalt pieces | U [2] | V¹* | V¹/U |
|---|---|---|---|
| +2.54–3.81 | 2.29 | 1.28 | 0.56 |
|  | 3.11 | 1.71 | 0.55 |
|  | 4.36 | 2.13 | 0.49 |
| +3.81–5.08 | 2.29 | 1.40 | 0.61 |
|  | 3.11 | 1.77 | 0.56 |
|  | 4.36 | 2.13 | 0.49 |
| +5.08–7.62 | 2.29 | 1.51 | 0.67 |
|  | 3.11 | 1.89 | 0.61 |
|  | 4.36 | 2.35 | 0.54 |
| +7.62–10.16 | 2.29 | 1.52 | 0.69 |
|  | 3.11 | 2.01 | 0.65 |
|  | 4.36 | 2.41 | 0.56 |
| +10.16–12.70 | 2.29 | 2.01 | 0.88 |
|  | 3.11 | 2.28 | 0.74 |
|  | 4.36 | 2.74 | 0.63 |

[1] The size range is given in inches with respect to the largest dimension.
[2] U is the peripheral speed of the rollers in metres per second.
* V¹ is the average velocity of basalt pieces attained over 15.24 centimetres before discharge, measured in metres per second.

The effects in practice of varying both the peripheral speed of the rollers and their inclination to the horizontal are illustrated in Table 4. This table gives experimental data for the case of successive small brass cylinder bodies (diameter 0.635 centimetre and average length 0.826 centimetre) fed into the higher end of the trough formed by a pair of rollers. These consisted of identical copper cylinders with a constant minimum separation of 0.305 centimetre, each of diameter 5.08 centimetres and length 30.48 centimetres and rotating symmetrically in condition (X). Successive adjustments were made to the peripheral speed of the rollers and their inclination to the horizontal. In each case, a terminal velocity was attained and this was measured over a 15.24 centimetres distance of uniform sliding.

TABLE 4

| Roller inclination, degrees | U [1] | V [2] | V/U |
|---|---|---|---|
| 4 | 6.1 | 0.4 | 0.06 |
|  | 20.1 | 1.2 | 0.06 |
|  | 26.5 | 1.8 | 0.07 |
|  | 39.9 | 3.5 | 0.09 |
| 9 | 6.7 | 1.0 | 0.15 |
|  | 14.5 | 2.6 | 0.18 |
|  | 38.8 | 7.6 | 0.19 |
| 13 | 6.7 | 2.2 | 0.34 |
|  | 26.6 | 9.6 | 0.36 |
|  | 42.6 | 16.9 | 0.39 |
| 20 | 6.7 | 4.0 | 0.60 |
|  | 26.6 | 16.9 | 0.64 |
|  | 45.6 | 38.1 | 0.83 |
| 34 | 18.8 | 19.1 | 1.01 |
|  | 35.4 | 39.9 | 1.13 |

[1] U is the peripheral speed of the rollers in centimetres per second.
[2] V is the terminal velocity of the bodies in centimetres per second.

From the results in Table 4 it is seen that the ratio V/U increases somewhat with increasing peripheral speed. Thus, in practice, the relationship between terminal velocity and peripheral roller speed is not strictly linear. This effect can be ascribed to (i) a possible decrease in the coefficient of dynamic friction with increasing peripheral roller speed, and (ii) increasingly discontinuous contact between sliding bodies and roller surfaces with increasing peripheral roller speed.

For inclinations greater than critical—i.e. those at which sliding will occur even in the absence of roller rotation—throughput can still be controlled (though with reduced success) by varying peripheral speed in the manner explained.

While the rate of throughput can be increased either by increasing the inclination of the rollers or by increasing their peripheral speed, it has been found in practice that these are not always equally satisfactory alternatives. Thus, it has been found that it is preferable to increase the rate of throughput of substantially spherical bodies (e.g. rocks, fruit) by increasing the peripheral speed of the rollers rather than by increasing their inclination. On the other hand, the reverse obtains in the case of bodies having a single large dimension (e.g. logs, nails). Optimum conditions for a particular body type can be determined readily by experiment.

The method of aligning according to the second aspect of the invention can also be practised with a pair of rollers divided into sections along their length, the member rollers of different sections rotating at different peripheral speeds. By this expedient, initially slow alignment on roller sections rotating at relatively low peripheral speeds can be remedied subsequently by more rapid alignment on roller sections rotating at relatively high peripheral speeds.

Additionally, when an aligned row of bodies in closely abutting relationship is caused to slide from a first region in which the peripheral speed of the rollers is low to a second region in which the peripheral speed is high, it will be appreciated that the increased sliding velocity at the second site will effect spacing between member bodies of the row. By suitably adjusting the difference in peripheral speeds in the two regions, it is possible to effect any required degree of spacing between the bodies. Conversely, spacing between the member bodies of an aligned row can be reduced as required by causing a reduction in sliding velocity between two regions on the rollers.

Embodiment II has been discussed hitherto in relation to rollers of cylindrical shape. It will be understood however that it may be advantageous in some cases to effect aligning in a trough formed by a pair of non-cylindrical rollers. When the rollers consist at least in part of a part of uniformly tapering frusto-conical sections, the peripheral speed varies progressively along the roller surface. As explained above, this arrangement results in the progressive spacing apart or crowding together of the member bodies of an aligned row. The required degree of spacing apart for any given circumstances can thus be achieved in a simple manner by selecting rollers of an appropriate frusto-conical shape.

Whether cylindrical or frusto-conical, the rollers need not be in surface contact with each other; and indeed—as previously explained—it is sometimes necessary to separate them so as to fulfill the requirements of the second aspect of the invention. It will be understood for course that the rollers should not be separated throughout their length by a distance such that bodies for aligning can pass freely between them.

In circumstances when a batch of unaligned bodies—say, pieces of ore—is mixed with small contaminant bodies—say, gravel—it may be advantageous to employ rollers separated from each other throughout their length by a distance sufficient to allow the contaminant bodies to pass freely between them.

Having regard to the requirements of the second aspect of the invention, it is also possible to vary the separation between the rollers along their length. According to a preferred arrangement, the roller separation is greater at the feeding site than at the retrieval site. The greater the roller separation at any site, the nearer to the nip can bodies be introduced. By adopting the suggested arrangement, it is therefore possible to effect initially rapid alignment by taking advantage of the high degree of differential sliding that occurs when there is an appreciable separation at any site between bodies near to the nip and distant from it. This arrangement also results in (i) an increased acceleration of bodies down the trough—thus facilitating rapid alignment—and results consequentially in (ii) a degree of separation between bodies, which may be desired in certain circumstances.

The rollers of embodiment II are in symmetrical rotation. By selecting such conditions it can be ensured that aligned bodies when retrieved will have negligible angular velocity. This property is essential for the success of some subsequent operations where stable orientation is required. For example, it is desirable that pieces of asbestos ore shall be aligned in stable orientation during the treatment prior to sorting disclosed in our Australian patent applications Nos. 52,477/64 and 58,530/65. Provided excessive roller speeds are avoided, aligning in stable orientation is readily achieved by practising embodiment II of the present invention; at very high roller speeds, some angular velocity may be imparted to bodies due to non-central positioning in the trough.

Of the two symmetrical possibilities, it is preferred generally to effect aligning on rollers rotating in condition (X) rather than in condition (Y). There is in the former case no chance of bodies being compressed towards the nip thereby suffering or causing damage. Consequentially also, wear on the rollers is kept to a minimum.

In cases where sliding stability is of particular importance, it may be preferred to effect aligning on rollers rotating in condition (Y); and in such circumstances, it has been found possible to prevent damage to the bodies and/or the rollers by inserting a thin suporting member (for example, a rod) between the rollers at an appropriately low height above the nip.

If it is of no consequence whether or not bodies are retrieved in a rotating or non-rotating condition, it is unnecessary to effect aligning on rollers rotating symmetrically according to embodiment II. If it is desired to retrieve bodies in a rotating condition, it is of course essential to effect aligning on rollars rotating non-symmetrically (e.g. rollers rotating in the same sense—both clockwise or both anticlockwise—with the same of different peripheral speeds at any site).

For certain requirements, as hereinafter explained, a favoured method of retrieval according to the second aspect of the invention comprises the step: causing said single row alignment of bodies to slide into a second inclined trough consisting at least terminally of the trough-defining surfaces formed by a pair of closely spaced, substantially frusto-spheroidal rotating rollers, said frusto-spheroidal rollers being inclined equally in a single plane to the horizontal; whereby said bodies slide down said second trough and are discharged gravitationally therefrom; said method of retrieval being characterized by the preliminary step of selecting interdependently the length and radius of curvature of the frusto-spheroidal rollers in such a way that the normal reaction at the site of discharge between said bodies and the frusto-spheroidal rollers is positive but not substantially greater than zero. An advantage flowing from this method of retrievel is that it can be ensured thereby that the bodies will be discharged into a predictable trajectory. This may be of the utmost importance in the case when, for example, the bodies are required to be examined successively by photoelectric means for the purpose of sorting.

The invention also includes apparatus for rotating a single row alignment of bodies according to a method comprising this defined method of retrieval.

In embodiment II(a), aligning of a batch of unaligned bodies is effected in an inclined potential energy trough formed by a pair of rollers conforming to the requirements of embodiment II, and retrieval is effected by gravitational discharge from a second trough consisting at least terminally of the trough-defining surfaces formed by a pair of identical, substantially frusto-spheroidal rollers conjoined (directly or indirectly) to the respective rollers forming said first mentioned trough.

This embodiment of the invention will be understood more clearly with reference to FIGURES 4 and 5 of the annexed drawings.

FIGURE 4 illustrates the two-sectioned path 1, 2 described by a body 3 of mass $m$ sliding under gravitational acceleration $g$ down to a two-sectioned trough according to embodiment II(a). The first section 1 of the path corresponds to sliding down a first trough section formed by a pair of identical, cylindrical rollers (not shown), and the second section 2 of the path corresponds to sliding down a second trough section formed by a conjoined pair of identical, substantially frusto-spheroidal rollers (also not shown).

When the second section of the path is considered as an arc of a circle having a radius $r$, when the angle between the vertical and the direction of body travel is $\alpha$, when the sliding velocity of the body is $v$, it can be shown that the normal reaction between the body and the rollers is only zero in the second section of the path when the following equation is satisfied: $mg \sin \alpha + mv^2/r = 0$. Thus, given the desired discharge velocity of the body and the inclination of the rollers to the horizontal, the radius of curvature of the second section of the path (considered as a circle) can readily be calculated. This calculated radius of curvature of the second section of the path is an optimum for the purpose of discharging the body from the trough in a predictable trajectory and serves as a basis for calculating the optimum curvature of the substantially frusto-spheroidal rollers.

It will be appreciated tht discharge into a predictable trajectory can only be possible when the paths described by all contact surfaces of the bodies are determined by contact at the site of discharge with the frusto-spheroidal rollers. In travelling along the arc of a circle of given centre, the direction of movement of a body is continuously changing; hence, in the case of bodies having a single large dimension, discharge into a predictable trajectory can only be possible when the length of the frusto-spheroidal rollers is sufficient (having regard to the speed of the bodies and their moment of inertia about the said centre) to enable this continuous directional change to occur.

FIGURE 5 illustrates a plan view of two troughs, (a) and (b), each conforming to the requirements of embodiment II(a) and being formed by two pairs of composite rollers.

Trough (a) is formed by a first pair of identical, cylindrical rollers 1, 3—for aligning bodies—conjoined to a second pair of identical, substantially frusto-spheroidal rollers 2, 4—for discharging bodies into a predictable trajectory.

Trough (b) is formed by a first pair of identical cylindrical rollers 10, 40—for aligning bodies—conjoined to a second pair of composite rollers 20, 30; 50, 60—for discharging bodies into a predictable trajectory. This second pair of rollers consists terminally of a pair of identical, substantially frusto-spheroidal rollers 30, 60 conjoined to a pair of hyperboloid-like rollers 20, 50. By providing the latter rollers, the aligning section of the trough (which, in this case, is formed by a pair of minimally separated rollers) can be combined with a discharging section of greater length than would otherwise be possible.

When bodies in a given batch are discharged from a trough—say, according to the second aspect of the invention—their trajectories are found to vary both horizontally and vertically about an average.

In the case of a batch of identical bodies—say, identical wooden cylinders—the vertical trajectory variation is substantially the same as the horizontal trajectory variation. In the case of a batch of non-identical bodies—say, pieces of crushed basalt having widely varying dimensions—the vertical trajectory variation is liable to be considerably greater than the horizontal trajectory variation. However, in both cases, it has been found that the trajectories of bodies discharged from a trough according to embodiment II(a) are subject to less variation (both horizontally and vertically) than the trajectories of bodies discharged from a trough according to embodiment II, i.e. the former trajectories are more predictable than the latter.

As an illustration of this finding, Table 5 gives results of an experiment in which comparison is made between the trajectories of a batch of identical wooden cylinders when discharged from a trough (A) according to embodiment II, and when discharged from a trough (B) according to embodiment II(a) as shown in FIGURE 5.

The rollers forming trough (A)—which were identical to the rollers forming the aligning section of trough (B)—consisted of copper cylinders, each of diameter 5.08 centimetres, length 60.96 centimetres and inclined at 17° to the horizontal. The separation between these cylindrical rollers was in each case (uniformly) 0.635 centimetre. The frusto-spheroidal rollers forming the discharging section of trough (B) were of mild steel, their maximum diameter was 6.35 centimetres and their length was 7.62 centimetres.

The rollers forming the troughs were rotated symmetrically in condition (X). Identical wooden cylinders—each of diameter 1.58 centimetres and of length 1.905 centimetres—were fed to the higher ends of the troughs, achieved terminal sliding velocity therein, and were subsequently discharged from the lower ends. The discharge velocity was ascertained in each case, and trajectory variations were measured in terms of the angular divergence (horizontally and vertically) from the average trajectory. In different experiments, the angular velocity of the rollers was varied between 228 and 615 revolutions per minute. Each result given in the table represents the average of not less than 50 observations.

TABLE 5

| Angular velocity [1] | Discharge velocity [2] | Angular divergence,[3] degrees | |
|---|---|---|---|
| | | Trough (A) | Trough (B) |
| 228 | 24.7 | ±8 | ±3 |
| 379 | 40.8 | ±8 | ±2 |
| 480 | 50.1 | ±7 | ±3 |
| 615 | 66.5 | ±12 | ±3 |

[1] Of the rollers, in revolutions per minute.
[2] Of the bodies, in centimetres per second.
[3] Horizontal and vertical values were the same.

Table 6 gives results of a similar experiment in which the trajectories of a batch of non-identical pieces of basalt (maximum dimension 1.6 centimetres, minimum dimension 1.3 centimetres) when discharged from described trough (A), were compared with the trajectories when discharged from described trough (B). Velocity units are as given for Table 5.

TABLE 6

| Angular velocity | Discharge velocity | Trough (A) degrees | | Trough (B) degrees | |
|---|---|---|---|---|---|
| | | $x$ [1] | $y$ [2] | $x$ | $y$ |
| 228 | 21 | ±12 | ±12 | ±4 | ±4 |
| 379 | 35 | ±15 | ±20 | ±4 | ±7 |
| 615 | 56 | ±20 | ±20 | ±8 | ±10 |

[1] Horizontal angular divergence.
[2] Vertical angular divergence.

Frictional gradients hitherto described have been in relation to aspects of the invention in which aligning is effected in a trough formed by a rotating concave member or by a pair of closely spaced rotating rollers.

It will be appreciated however that it is within the scope of the invention to effect aligning in troughs comprising a wide variety of trough-defining surfaces.

According to a third aspect of the invention, a method is provided for obtaining a single row alignment of bodies comprising the steps:

(1) Feeding a batch of unaligned bodies at a first site into an inclined potential energy trough comprising the trough-defining surfaces formed by three or more rotating rollers, said rollers being substantially longitudinally parallel and closely spaced transversely, whereby: said bodies engage in frictionally differential pressure contact with said trough-defining surfaces, slide differentially down said trough, and are formed progressively into a single row alignment;

(2) Retrieving from said trough at a second site said single row alignment of bodies.

The invention also includes apparatus for obtaining a single row alignment of bodies according to this defined method.

The diameters of the rollers usable in the third aspect of the invention—unlike the diameters of the rollers usable in the second aspect of the invention—are preferably of a similar order to the smallest dimensions of the bodies constituting the unaligned batch. In this aspect of the invention it is therefore possible to control the frictional gradient over the trough-defining surfaces by suitably adjusting the peripheral speeds of the constituent rollers.

According to embodiment III(a), aligning of a batch of bodies is effected in an inclined potential energy trough comprising the trough-defining surfaces formed by a V-shaped combination of identical rollers (cylinders or frusto-conical sections), the peripheral speeds of the rollers progressively decreasing with increasing height above the base of the trough.

A cross-sectional view of such a combination is illustrated in FIGURE 6 of the annexed drawings. In this case, each wall of the trough is provided by four identical rollers (1) rotating in the same direction, the base of the trough being provided by two of said rollers rotating symmetrically in condition (X). Suitably, the ratio of roller diameter to the smallest body dimension is 2:1.

The required gradient of peripheral roller speed up the sides of the trough is achieved conveniently by means of a cone pulley arrangement, as illustrated 2, 3. As a result of this gradient, bodies sliding at the base of the trough are caused to have higher terminal velocities than those sliding at the top f the trough.

According to embodiment III(b), aligning of a batch of bodies is effected on the surfaces formed by a substantially planar combination of identical rollers (cylinders or frusto-conical sections). The rollers are inclined equally in a single plane to the horizontal and rotate with peripheral speeds progressively decreasing with increasing separation from a central member pair.

This centrally located pair of rollers is caused to rotate symmetrically towards the nip in condition (Y), the roller(s) on one side of the central pair being caused to rotate in a single direction (say, clockwise) and the roller(s) on the other side of the central pair being caused to rotate in the alternative (anticlockwise) direction. Suitably, the ratio of roller diameter to the smallest body dimension is 1:2.

When a batch of bodies is fed on to this planar combination of rollers, the component bodies of the batch spread over the roller surfaces and are then caused to slide progressively and differentially towards the central pair of rollers. They are held on this central pair of rollers and are conveyed thereby to the retrieval site.

It will be understood that the described surface combination fulfills the requirements of a potential energy trough (as herein defined), since it comprises transversely a central region towards which a supported body tends to move.

According to a fourth aspect of the invention, a method is provided for obtaining a single row alignment of bodies comprising the steps:

(1) Feeding a batch of unaligned bodies at a first site into an inclined potental energy trough comprising the trough-defining surfaces formed by a plurality of members selected from the group consisting of rods and belts, said members being substantially longitudinally parallel and closely spaced trasversely concavely and alternate said members moving longitudinally with progressively differential speeds up the sides of the trough, said progressively differential speeds being selected from the group consisting of increasingly differential speeds and decreasingly differential speeds; whereby: said bodies engage in frictionally differential pressure contact with said trough-defining surfaces, slide differentially down said trough, and are formed progressively into a single row alignment;

(2) Retrieving from said trough at a second site said single row alignment of bodies.

It will be understood that the term "moving" as used herein and in the appended claims in relation to rods and belts, comprehends both continuous and intermittent movement.

The invention also includes apparatus for obtaining a single row alignment of bodies according to this defined method.

According to embodiment IV, aligning of a batch of bodies is effected in an inclined potential energy trough comprising the trough-defining surfaces formed by a suitable arrangement of several rods or belts—say, identical endless belts—substantially longitudinally parallel to each other and closely spaced transversely to form a V-shaped trough. By selection of appropriately narrow belt surfaces relative to the dimensions of the bodies, and by arranging alternate belt surfaces to move longitudinally with suitably differential speeds up to the sides of the trough, a frictional gradient can be provided whereby to effect the single row alignment of a batch of unaligned bodies. In one suitable arrangement, the ratio of the trough-defining surface width of each belt to the smallest body dimension is less than 1:2, and alternate belts are caused to move continuously in opposite directions (say, positive and negative directions), the speeds both of the positively moving belts and of the negatively moving belts increasing progressively up the sides of the trough. As a result of this arrangement, member bodies of the batch which are near the bottom of the trough are submitted to a higher degree of frictional retardation than bodies near the top of the trough, and the former bodies herefore slide more slowly down the trough than the latter.

It will be appreciated that in this aspect of the invention, the direction of sliding is parallel to the direcion of movement of the trough-forming rods or belts, whereas in all previously described aspects of the invention, the direction of sliding has been normal to the direction of movement of the trough-forming members.

It will be understood that the described embodiments and variants are in no sense restrictive and additional embodiments and variants are clearly possible within the scope of the invention.

By way of illustration, at least one of the trough-defining surfaces may be provided by a static member (as in embodiment I(b)). Such a static member can consist of a stationary roller or a stationary belt, rod or sheet. In such cases, the progressive alignment of bodies depends essentially on differential frictional retardation by those of the trough-defining surfaces which are provided by members in substantially continuous movement, i.e., the static member has merely a guiding function.

Feeding of bodies into the various troughs can be accomplished in any convenient manner.

In one preferred method, bodies can be metered to the trough from a vibrating feeder.

In another preferred method, a hopper is situated above the trough at its upper end, and bodies are fed therefrom to the trough. If it is required to reduce the effective rate of hopper feeding (e.g. should the available trough length be inadequate to effect aligning at a given feeding rate), a feed retaining member can be inserted in the trough immediately below the feeding site. By choosing a retaining member of suitable dimensions, (i) the bodies will be spread over the trough-defining surfaces in an optimum manner for aligning by the invention, and (ii) the effective rate of feeding will be reduced.

In an alternative or additional method of reducing the effective rate of feeding, the hopper is located above a metering trough (which need not conform to the requirements of a trough according to the present invention) and the bodies are metered therefrom at a controlled rate into the aligning trough. Conveniently, the metering trough is formed by a pair of identical, closely spaced, symmetrically rotating cylinders. By selecting metering rollers of suitable diameter, and by appropriately adjusting their peripheral speed and/or inclination to the horizontal, the metering rate can be controlled as desired (according to principles already discussed).

Unless it is required to discharge the bodies after alignment into a predictable trajectory (in which case, the retrieval method employed must be carefully selected, for example as in embodiment II (a)), retrieval of bodies from the various troughs can be accomplished in any convenient manner. In most cases, it will be found satisfactory to retrieve the aligned bodies by simple discharge onto a suitable conveyor belt system.

FIGURE 7 is a perspective view of typical apparatus for obtaining a single row alignment of bodies according to the method of embodiment II(a), incorporating the feeding means (metering trough) discussed above.

The apparatus comprises essentially: means for feeding, means for aligning and means for retrieval.

The feeding means comprises a hopper 1 located above a metering trough formed by a first pair of identical, rotatable, cylindrical rollers 2, 3. The aligning means comprises a trough formed by a second pair of identical, rotatable, cylindrical rollers 4, 6. Attached to the hopper is a feed retaining member 11 having a shape such as to spread bodies from the metering trough over the roller surfaces of the aligning means. The retrieval means comprises (i) a trough formed by a pair of identical, rotatable, minimally separated, substantially frusto-spheroidal rollers 5, 7 and (ii) a V-shaped trough formed by two appropriately inclined endless belts 8, 9 supported on a framework 12.

The frusto-spheroidal rollers 5, 7 are conjoined respectively to the cylindrical rollers 4, 6 so as to be rotatable therewith. The axes of rotation of all the rollers are parallel and inclined suitably to the horizontal.

The apparatus is mounted on a framework comprising legs 10, which are adjustable vertically to effect the desired inclination of the rollers to the horizontal.

Suitable drive means (shown only in FIGURE 7) are provided for rotating the rollers in condition (X). The roller assembly 2, 4, 5 and the roller assembly 3, 6, 7 are driven respectively by a suitable motor diagrammatically shown as M and connected to the roller assemblies through a shaft diagrammatically shown as S, or by other suitable means.

When the apparatus is designed to align pieces of crocidolite asbestos ore (minimum dimension 6.35 centimetres, maximum dimension 8.89 centimetres) at a throughput rate of 1.52 metres per second, the dimensions, speeds and inclination given in Table 7 have been found to be satisfactory. The belts comprising the conveyor trough are caused to move in a horizontal direction at a speed consistent with the throughput rate.

TABLE 7

| Characteristic | Roller identification, Figure 7 | | |
| --- | --- | --- | --- |
| | 2, 3 | 4, 6 | 5, 7 |
| Length in metres | 0.61 | 3.05 | 0.48 |
| Diameter in metres | 0.61 | 0.61 | [1] 0.66 |
| Peripheral speed in metres per second | 0.61 | 3.05 | [2] |
| Inclination to horizontal, degrees | 12 | 12 | 12 |

[1] The maximum value.
[2] This peripheral speed varies progressively along the rollers in fixed relationship at any site to the peripheral speed of rollers 4, 6.

Successful aligning according to the various aspects of the invention is dependent on causing the bodies to slide in stable equilibrium on the trough-defining surfaces, and any tendency of the bodies to roll or bounce thereon is necessarily inimical to maintaining this equilibrium.

The importance of not employing a trough inclined to the horzontal at an angle exceeding the critical angle has already been discussed in relation to the second aspect of the invention.

It has also been found that the stability of low density bodies (for example, blocks of wood, corks, peas, coffee beans) can be improved greatly by effectively increasing their weight while moving in the various troughs according to the invention. Referring to the second aspect of the invention, for example, this can be accomplished by causing one or more suspended chains (fixed, moving or movable) to bear down on a batch of bodies while sliding in the trough formed by the rollers. By such means, (i) the tendency of such bodies to bounce is considerably reduced, and (ii) the bodies are spread positively over the roller surfaces in such a manner as to facilitate differential sliding.

In an alternative method of improving the stability of such low density bodies, particularly applicable to the second and third aspects of the invention, it has been found that bouncing can be largely reduced by inserting a deflector sheet longitudinally above the nip of the rollers.

It will be apparent that certain operations can be conducted on an aligned single row of bodies while they are still sliding in the trough towards the site of retrieval. For example, when the bodies are pieces of mined ore, it may be convenient to perform a drying or washing operation during this stage; and in the case of a washing operation, it will be preferred to avoid contact between the separate trough-defining surfaces to enable wash liquid to escape.

In the case of the second aspect of the invention, where an operation at one site on the roller surfaces needs to be shielded from another operation at another site on the roller surfaces, this can be achieved in a simple manner by equipping one roller between the two sites with one or more helical shields normal to its surface, and providing the surface of the cooperating roller with one or more grooves into which and from which the shield or shields can be progressively inserted and retracted as the rollers rotate. It will be appreciated that such shields do not function to propel the bodies down the trough.

According to the invention disclosed in our Australian patent applications Nos. 52,477/64 and 58,430/65 (hereinbefore noted), pieces of asbestos ore are prepared for sorting by preliminary steps including heating and examination by infra-red detecting means. As described therein, if the pieces of ore are to be conveyed in a straight line from the heating zone to the detection zone a shield must be provided to prevent infra-red radiation from the heating zone travelling along the same straight line to the detection zone. It can be readily seen that by adopting the above expedient (a helical shield), these two operations of heating and detection can be performed on a row of asbestos pieces while sliding according to the present invention in the trough formed by a pair of rollers. The present invention in this form can therefore be considered to be complementary to this prior invention relating to the preparation of asbestos ore for sorting.

While the invention has been described in relation only to the aligning of a limited number of body types such as rocks, stones, cylinders, peas, blocks of wood, corks, coffee beans and pieces of asbestos ore, it will be understood that it is not restricted in application to these specified body types but may be invoked to effect the aligning of a very wide variety of body types in a simple and controllable manner.

I claim:
1. Apparatus for obtaining a single row alignment of bodies, said apparatus comprising an inclined potential energy trough comprising the trough-defining surfaces formed by a pair of closely spaced, rotatably mounted rollers, means for rotating the rollers, means for feeding a batch of unaligned bodies into said trough at a first site at the higher end thereof, means for retrieving bodies from said trough at a second site at the lower end thereof in single row alignment, characterized in that said means for retrieving bodies comprises a second inclined trough substantially continuous with said first-mentioned trough, said second trough consisting at least terminally of a pair of closely spaced, rotatably mounted, substantially frusto-spheriodal rollers, said frusto-spheroidal rollers being inclined equally in a single plane to the horizontal, means for rotating said frusto-spheroidal rollers; the length and radius of curvature of said frusto-spheroidal rollers being such that, in operation, the normal reaction at the site of discharge between said bodies and said frusto-spheroidal rollers is positive but not substantially greater than zero.

References Cited

UNITED STATES PATENTS

| | | | |
|---|---|---|---|
| 2,763,108 | 9/1956 | Garrett | 198—127 X |
| 2,776,037 | 1/1957 | Baigent | 198—30 |
| 2,988,197 | 6/1961 | Grosz | 198—30 |

FOREIGN PATENTS 904,120  2/1954  Germany.

EVON C. BLUNK, *Primary Examiner.*

M. L. AJEMAN, *Assistant Examiner.*

U.S. Cl. X.R.

198—53, 127, 128